(12) United States Patent
Veni et al.

(10) Patent No.: US 8,244,934 B2
(45) Date of Patent: Aug. 14, 2012

(54) DATA STORAGE NETWORK MANAGEMENT

(75) Inventors: Sakshi Chaitanya Veni, Karnataka (IN); Vijayakumar Balasubramanian, Karnataka (IN); Guruprasad Ramachandrachar, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 81 days.

(21) Appl. No.: 12/625,117

(22) Filed: Nov. 24, 2009

(65) Prior Publication Data

US 2010/0161852 A1 Jun. 24, 2010

(30) Foreign Application Priority Data

Dec. 22, 2008 (IN) .......................... 3239/CHE/2008

(51) Int. Cl.
*G06F 3/00* (2006.01)
*G06F 5/00* (2006.01)

(52) U.S. Cl. .......................................... 710/38; 710/36

(58) Field of Classification Search .................. 710/36, 710/38
See application file for complete search history.

(56) References Cited

U.S. PATENT DOCUMENTS

| | | | |
|---|---|---|---|
| 6,349,351 B1 * | 2/2002 | Shimizu et al. ................. | 710/38 |
| 2002/0170004 A1 | 11/2002 | Parrett et al. | |
| 2003/0005119 A1 * | 1/2003 | Mercier et al. ................. | 709/225 |
| 2008/0126615 A1 | 5/2008 | Sinclair et al. | |
| 2008/0147878 A1 | 6/2008 | Kottomtharayil et al. | |

FOREIGN PATENT DOCUMENTS

EP 1271296 1/2003

OTHER PUBLICATIONS

Nigel Hone, Linux Storage Multipathing Techniques, May 16, 2006, IT-Symposium 2006 Vortrag 3L04, DE.

\* cited by examiner

*Primary Examiner* — Chun-Kuan Lee
*Assistant Examiner* — David Martinez

(57) ABSTRACT

Disclosed is a method of managing a data storage network comprising a plurality of data storage volumes and a plurality of paths for connecting a server to a selected one of said data storage volumes, comprising determining, for an individual path, a plurality of performance parameters of said path during an interval; calculating a path performance metric from a combination of the determined performance parameters; and, if the path performance metric falls below a predefinable quality standard blocking the individual path from being used for a data communication with one of the data storage volumes; and signaling the blocking of the individual path. A computer program product and a server adapted to implement this method are also disclosed.

15 Claims, 3 Drawing Sheets

US 8,244,934 B2

DATA STORAGE NETWORK MANAGEMENT

CLAIM FOR PRIORITY

The present application claims priority under 35 U.S.C. §119 to Indian Patent Application 3239/CHE/2008, filed on Dec. 22, 2008, the disclosure of which is hereby incorporated by reference in its entirety.

BACKGROUND OF THE INVENTION

Data storage networks such as a storage area network (SAN) are commonly used in environments where large volumes of data require storing. Such networks provide access to multiple data storage volumes that are typically distributed over one or more physical data storage devices that provide the necessary storage capacity. Such data storage networks can typically be accessed by many users through one or more servers, which are coupled to the storage devices through multiple paths. The multiple paths ensure that the stored data is highly available to a large number of users, and facilitate I/O load balancing over the network.

Performance issues may arise when some of the paths in the network are slow or unreliable, for instance because of failing hardware components in the path. This can cause increases in the latency of the data communication between data storage device and the device at the other end of the network requesting access to the data storage device.

For this reason, the server's multiple path access management software may comprise a path monitoring function that periodically tests the paths of the data storage network, e.g. through polling, to ensure that I/O requests are not assigned to failing paths, thereby guaranteeing a certain quality of service over the network. This generally works well when a discarded path is constantly failing, because the monitoring function will detect the path as being faulty each time the path performance is monitored.

However, problems may still arise when a path is intermittently failing. Such a path may appear healthy during a monitoring test cycle, such that it will be used for subsequent I/O communications to and from the data storage devices accessible through this path. If, however, during such an I/O communication, the path fails, e.g. goes off-line because of intermittent path component failure, the I/O communication can failover onto another path and subsequently failback onto the intermittently failing path, thus compromising network performance, and increasing thrashing. Moreover, failback onto another path may force a transition of logical unit numbers (LUNs) across the storage device controllers, thus further degrading network performance.

BRIEF DESCRIPTION OF THE EMBODIMENTS

Figure 1:
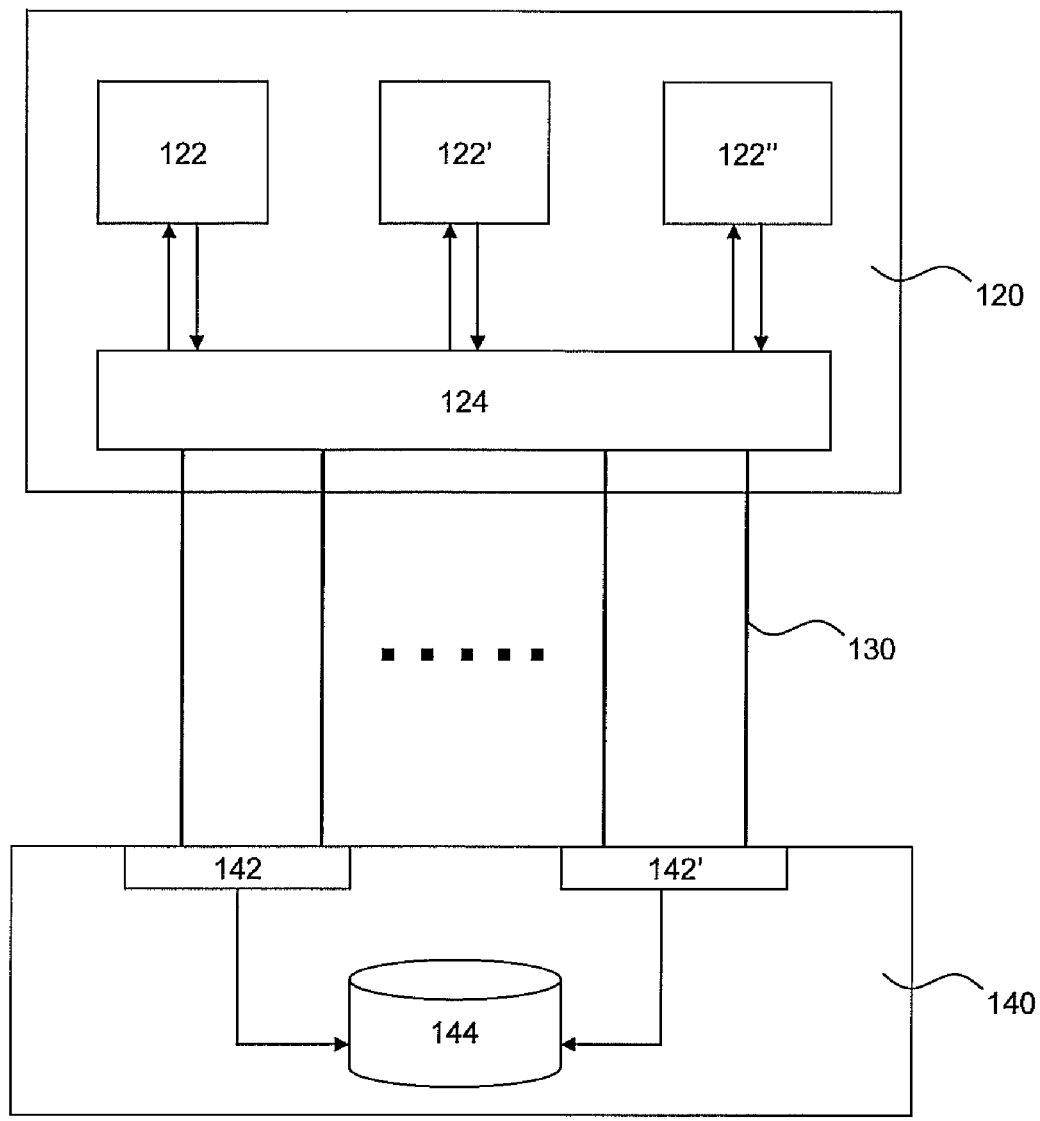
Figure 2:
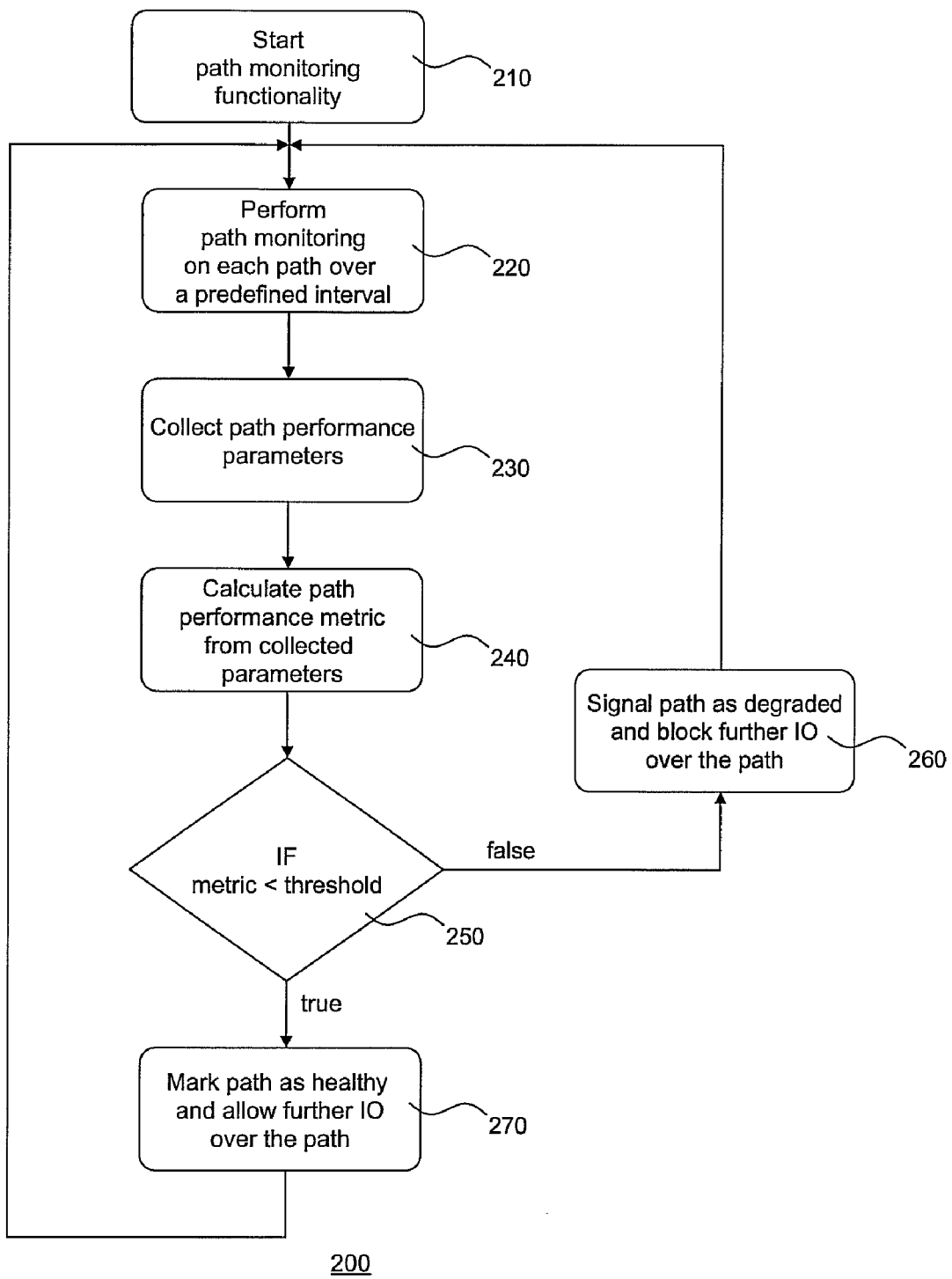
Figure 3:
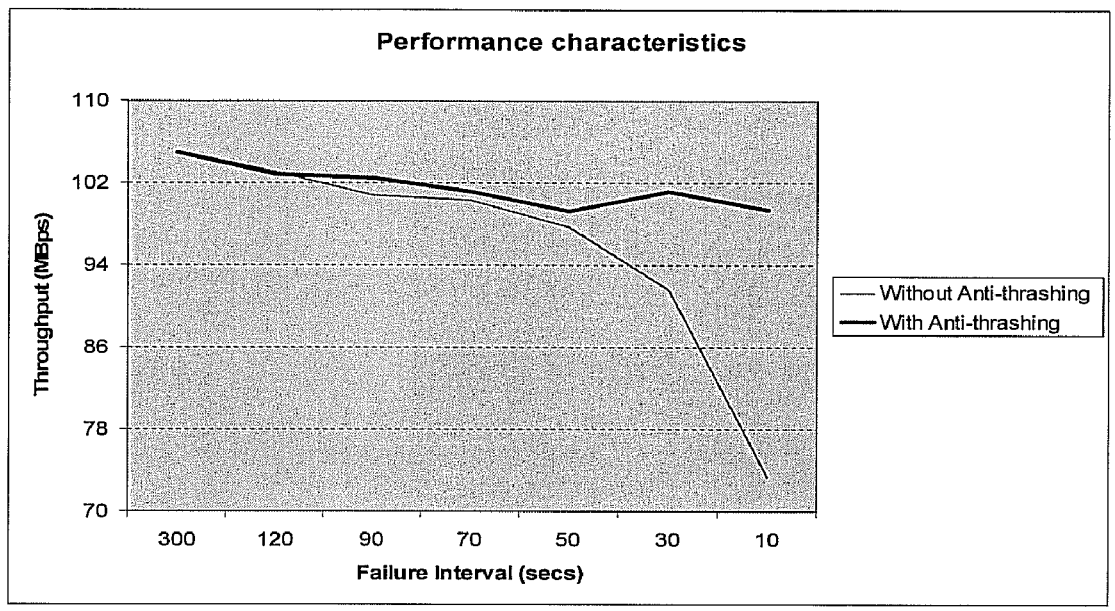

Embodiments of the invention are described in more detail and by way of non-limiting examples with reference to the accompanying drawings, wherein:

FIG. 1 schematically depicts a data storage network;

FIG. 2 depicts a flowchart of an embodiment of the method of the present invention; and FIG. 3 depicts a graph demonstrating the performance improvement over a data storage network when applying an embodiment of the method of the present invention.

DETAILED DESCRIPTION OF THE DRAWINGS

It should be understood that the Figures are merely schematic and are not drawn to scale. It should also be understood that the same reference numerals are used throughout the Figures to indicate the same or similar parts.

FIG. 1 schematically depicts an example embodiment of a data storage network 100, such as a SAN. Such a data storage network can be considered to comprise a host domain 120 arranged to communicate with a data storage layer 140 through multiple paths 130. The host domain 120 typically comprises one or more servers 124 (multiple servers may for instance be present to add redundancy to the network) that host a number of applications such as applications 122, 122' and 122". Three applications are shown by way of non-limiting example only; any number of applications may be hosted. The applications may run on the server 124 or may run on remote terminals, e.g. computers attached to the server over a network such as a LAN.

During operation, the server 124 may receive a data access or data storage request from one of the applications, e.g. application 122, in which case the server 124 will select a path 130 to the data storage domain 140 over which the data IO communication between the application 122 and the data storage domain 140 will take place. The data storage domain 140 typically comprises a number of controllers 142, 142' (two controllers are shown by way of non-limiting example only), that route the IO request to the appropriate volume on the data storage cluster 144. The data storage cluster 144 may comprise one or more data storage devices, which may be organized in any suitable form, e.g. as a redundant array of inexpensive disks (RAID), over which a plurality of data volumes, e.g. logical unit numbers (LUNs) are stored. A controller, e.g. controller 142, connects the IO traffic over one of the paths to the correct LUN on the data storage cluster 144.

It is reiterated that the representation of the data storage network 100 in FIG. 1 is schematic and simplified for the sake of clarity only. Such networks may comprise several additional components. For instance, each path 130 may further comprise a bus adapter, one or more switches and a channel adapter.

In fact, the presence of such hardware components on a path 130 increases the risk that the path may fail, i.e. lose its connection between the host domain 120 and the data storage domain 140, due to the fact that one of the hardware components forming part of the path develops a fault. As previously explained, such path failures can reduce the performance, i.e. increase the thrashing, of the data storage network 100, for instance when IO communication keeps failing over from and failing back to an erroneous path 130, which can happen if the path exhibits intermittent faulty behavior. Such path failures may force controllers such as controller 142 and 142' to transfer LUN tables from one controller to another in case a LUN is no longer accessible because of path failures. This has a further negative impact on the network performance.

In accordance with an embodiment of the present invention, the server 124 is adapted to implement a multi-pathing IO management solution to the communication between the host domain 120 and the data storage domain 140. This multi-pathing management solution enables the server 124 to apply load balancing over the paths 130 of the network 100 such that IO traffic is assigned to paths 130 that, at that point in time, offer the best bandwidth for the IO communication. In addition, this multi-pathing management solution is capable of predicting if a path 130 suffers from intermittent path failures.

To this end, during an interval the server 124 monitors a plurality of path performance parameters that may have some correlation with the intermittent occurrence of a failure of the path. The duration of the interval may be programmable, e.g. by the network operator. In an embodiment, the multi-pathing IO management solution comprises a graphical user interface in which aspects of the path monitoring, such as the duration of the interval and the performance parameters to be determined, may be selected. After the determination of the path performance parameters, the server 124 is adapted to apply a heuristic algorithm for calculating the path performance metric from the determined path performance parameters. In case this metric does not meet a predefined quality standard for the path performance requirements, for instance when the metric exceeds a predefinable threshold based on the weighted average probability of selected monitored incidents during the interval in which the performance parameters are determined, the path will be blocked, i.e. excluded from the load balancing by the server 124 such that no IO traffic can take place over this path.

A situation may arise in which all paths 130 are considered degraded paths. In this situation, the multi-pathing management application may be configured to fail back onto one or more degraded paths that have the best performance metric, i.e. closest to the required performance metric. This way, some accessibility of the data storage domain 140 is guaranteed.

Because of the fact that multiple performance parameters are considered to determine whether or not a path 130 is likely to suffer from intermittent failures, an improved performance metric is obtained for the path. Suitable performance parameters for determining this path performance metric include path state changes during the monitoring interval, the number of retries per IO communication, IO turn around time, and the number of frames dropped per IO packet during the monitoring interval. Other suitable parameters will be apparent to the skilled person.

In an embodiment, each path 130 is periodically monitored at regular intervals. If the network operator has been informed by the multi-pathing management application that a path 130 has been blocked, the network operator can remove the cause of the path degradation, e.g. by replacing a faulty component of the path, after which the multi-pathing management application will automatically reconsider the blocked path for load balancing because the performance metric of the path 130 will have improved following the repairs performed by e.g. the network operator.

In an embodiment, the multi-pathing management application is arranged to output the determined performance parameters together with the notification of a blocking operation on a path. In this way the network operator receives valuable diagnostic information that facilitates a more straightforward identification of the cause of the path degradation.

In an embodiment, the heuristic algorithm for determining the path performance metric is based on the number of state changes on the individual path during said interval, the number of I/O request retries over the individual path during said interval and the average turn around time of an I/O request over the individual path during said interval. It has been found that these performance parameters in particular provide a reliable indication of intermittent failures degrading the path 130.

In an embodiment, the heuristic algorithm may be implemented as follows:

$$P_H = (a*P_S + b*P_R C*P_T)/(a+b+c), \text{ wherein:}$$

$P_S$ is a probability component based on number of path state changes over the interval, with $P_S$=number of path state changes/maximum number of state changes allowed;

$P_R$ is a probability component based on the number of retries per IO over the interval, with $P_R$=number of retries per IO/maximum number of retries allowed);

$P_T$ is a probability component based on the average turn around time for IO communications over the interval, with $P_T$=average IO communication turn around time/threshold response time; and $P_H$ is the path performance metric expressed as a heuristic probability of a monitored path 130 being degraded, wherein $P_H$=the weighted average of individual probability components, wherein a, b, c are the weights associated with each probability.

By comparing each performance parameter with a predefinable value of the parameter indicative of the maximum value at which a path 130 is still considered to be healthy, a robust heuristic performance metric is obtained for the monitored path. This is for instance expressed by the fact that the value of $P_H$ may indicate a path being degraded even though some of the individual components of the equation used by this algorithm, such as $P_S$, would have indicated a healthy path. It will be appreciated that the above embodiment is by way of non-limiting example only, and that other embodiments of this heuristic algorithm, in which additional and/or other performance parameters are considered, are also feasible.

In an embodiment, the weighting factors a, b and c may be user-defined. In this way, network-specific failure causes can be given appropriate weights in this algorithm.

At this point, it should be noted that although the heuristic performance metric $P_H$ is expressed as a probability, it will be appreciated that $P_H$ is not a true probability because the value of $P_H$ may exceed 1. However, in case $P_H > 1$, this may be considered as an indication of a severely degraded path. This may for instance be used in the aforementioned situation where all paths appear to be degraded, in which case failback onto a severely degraded path will not be allowed.

It is further reiterated that the specific implementation of the data storage network 100 is not of crucial importance to the present invention. The multi-pathing management application may run on servers in any suitable type of data storage network. Other configurations of such networks will be apparent to the skilled person.

As previously explained, the server 124 is adapted to manage 10 traffic over a data storage network in accordance with the method of the present invention. An embodiment of such a method 200 is demonstrated in FIG. 2.

Upon starting the path monitoring functionality in step 210, the method proceeds to individually monitor each path 130 over a predefined interval in step 220, e.g. by using polling techniques, during which the path performance parameters are collected, as indicated in step 230. In an embodiment, this includes collecting the number of path state changes, the number of retries per IO and the average IO communication turn around time over said interval, as previously explained. The method 200 proceeds to step 240 in which the path performance metric is calculated from the determined performance parameters, such as the heuristic metric $P_H$. Once the path performance metric has been calculated, the method 200 proceeds to step 250 in which it is determined if the performance of the path 130 meets a predefined quality standard, for instance by comparing the path performance metric with a predefinable threshold.

In case the path 130 is considered to be degraded, i.e. is considered to suffer from intermittent path failures, the method 200 proceeds to step 260 in which the path is signalled as degraded and blocked from being used for load balancing IO traffic between the host domain 120 and the data storage domain 140. The signalling may include the performance parameters determined in step 230, as previously explained. Upon completion of step 260, the method 200 will revert back to step 220 for monitoring the next path 130.

In case the monitored path 130 is considered to be healthy in step 250, the method 200 will proceed to step 270 wherein the path 130 is labelled healthy and made available for load balancing IO traffic between the host domain 120 and the data storage domain 140. According to this mechanism, any path 130 that was previously excluded from load balancing will automatically be brought back on-line as soon as the path 130 has been repaired and monitored again.

An embodiment of the method of the present invention using the aforementioned heuristic algorithm $P_H=(a*P_S+b*P_R c*P_T)/(a+b+c)$, has been prototyped in the Device Mapper Multipath for Linux Multipathing Solution as disclosed in "Linux Multipathing" by Edward Goggin et al. in the Proceedings of the Linux Symposium, Jul. 20-23, 2005, Ottawa, Ontario Canada, Vol. 1, pages 147-168, and tested using a SAN configuration including a HP disk array.

The algorithm was studied under various I/O load conditions and SAN environments. The test setup used I/O patterns of 70% Reads and 30% Writes, 70% Random and 30% Sequential.

The test results are summarized in FIG. 3, where the network performance using the multi-pathing approach of the present invention, i.e. including the multi-performance parameter path monitoring to reduce network thrashing, is compared to a multi-pathing approach without this intermittent path monitoring.

It can be seen from FIG. 3 that the anti-thrashing solution provided by this embodiment of the present invention yields a 10% to 35% performance improvement over a known multi-path management approach in which no multiple path performance parameter monitoring is applied to decide if a path can be used for load balancing purposes. It is further pointed out that the algorithm used to determine the path performance metric employs a simple heuristic mathematical approach and the monitoring of the performance parameters indicative of the degradation symptoms is not computation intensive. Moreover, since these computations may be performed in path poll thread context rather than in an IO performance context, the method of the present invention may be implemented on a server 124 at very modest computational overhead.

The various embodiments of the method of the present invention may be implemented in a computer program product, which may be stored on a computer-readable data storage medium such as a CD-ROM, DVD, Internet accessible storage device and so on. The computer program product is adapted to, when executed on a server 124 of a data storage network 100, execute the steps of an embodiment of the method of the present invention. A server 124 may be provided that has this computer program product pre-installed or embedded in the server, e.g. in read-only or flash memory of the server. In an alternative embodiment, an embodiment of the present invention is incorporated in the server 124 in hardware.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A method of managing a data storage network comprising a plurality of data storage volumes and a plurality of paths for connecting a server to a selected one of said data storage volumes, comprising:
   a) determining, for an individual path, a plurality of performance parameters of said path during an interval;
   b) calculating a path performance metric from a combination of the determined performance parameters; and, when the path performance metric falls below a predefined quality standard:
   c) blocking the individual path from being used for a data communication with one of the data storage volumes; and
   d) signaling the blocking of the individual path.

2. The method of claim 1, wherein the plurality of performance parameters comprise at least one of:
   the number of state changes on the individual path during said interval;
   the number of I/O request retries over the individual path during said interval; and
   the average turn around time of an I/O request over the individual path during said interval.

3. The method of claim 2, wherein the step of calculating the path performance metric comprises calculating a weighted average of the performance parameters.

4. The method of claim 3, wherein the step of calculating a weighted average of the performance parameters comprises calculating the weighted average of:
   the number of state changes on the individual path during said interval divided by the maximum number of state changes allowable during said interval;
   the number of I/O request retries over the individual path during said interval divided by the maximum number of I/O request retries allowable during said interval; and
   the average turn around time of an I/O request over the individual path during said interval divided by a threshold response time.

5. The method of claim 1, wherein said signaling step comprises reporting the performance parameters of the blocked individual path.

6. The method of claim 1, further comprising periodically repeating steps a)-d) for each path in the data storage network.

7. The method of claim 1, further comprising making the individual path available for data communication with one of the data storage volumes if the path performance metric at least meets the predefinable quality standard.

8. A computer program product stored on a computer-readable data storage medium for, when executed on a server for managing access to a data storage network comprising a plurality of data storage volumes and a plurality of paths for connecting the server to a selected one of said data storage volumes, performing the steps of:
   a) determining, for an individual path, a plurality of performance parameters of said path during an interval;
   b) calculating a path performance metric from a combination of the determined performance parameters; and, when the path performance metric falls below a predefinable quality standard:

c) blocking the individual path from being used for a data communication with one of the data storage volumes; and d) signaling the blocking of the individual path.

9. The computer program product of claim 8, wherein the step of calculating the path performance metric comprises calculating a weighted average of the performance parameters.

10. The computer program product of claim 9, wherein the step of calculating a weighted average of the performance parameters comprises calculating the weighted average of:

the number of state changes on the individual path during said interval divided by the maximum number of state changes allowable during said interval;

the number of I/O request retries over the individual path during said interval divided by the maximum number of I/O request retries allowable during said interval; and the average turn around time of an I/O request over the individual path during said interval divided by a threshold response time.

11. The computer program product of claim 8, further being adapted to periodically repeat steps a)-d) for each path in the data storage network.

12. The computer program product of claim 8, further being adapted to make the individual path available for data communication with one of the data storage volumes if the path performance metric at least meets the predefinable quality standard.

13. A server for managing access to a data storage network comprising a plurality of data storage volumes and a plurality of paths for connecting the server to a selected one of said data storage volumes, said server being adapted to:

a) determine, for an individual path, a plurality of performance parameters of said path during an interval;

b) calculate a path performance metric from a combination of the determined performance parameters; and, when the path performance metric falls below a predefinable quality standard:

c) block the individual path from being used for a data communication with one of the data storage volumes; and d) signal the blocking of the individual path.

14. The server of claim 13, further being adapted to:

periodically repeat steps a)-d) for each path in the data storage network; and make the individual path available for data communication with one of the data storage volumes if the path performance metric at least meets the predefinable quality standard.

15. A data storage network comprising a server according to claim 13, a plurality of data storage volumes and a plurality of paths for connecting the server to the plurality of data storage volumes.

* * * * *